April 1, 1941.  C. E. DAVY  2,236,674
STEERING WHEEL HUB
Filed Oct. 18, 1937
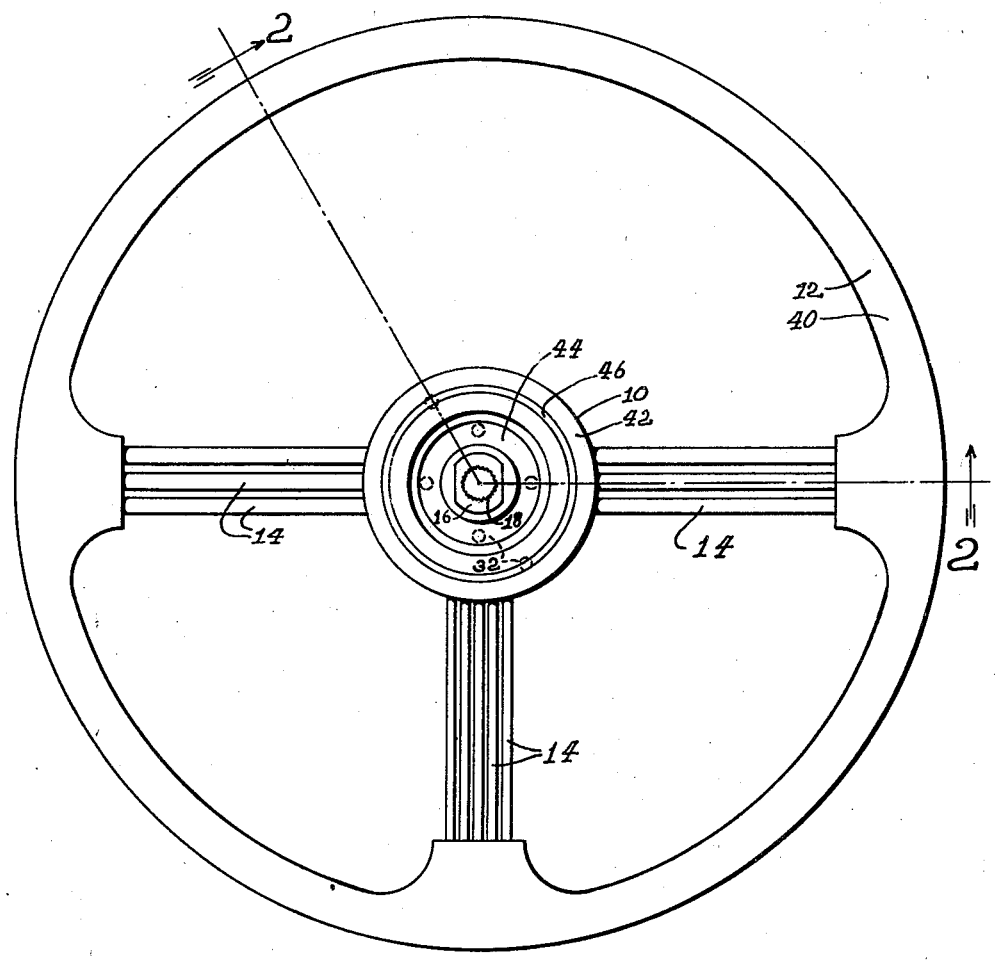
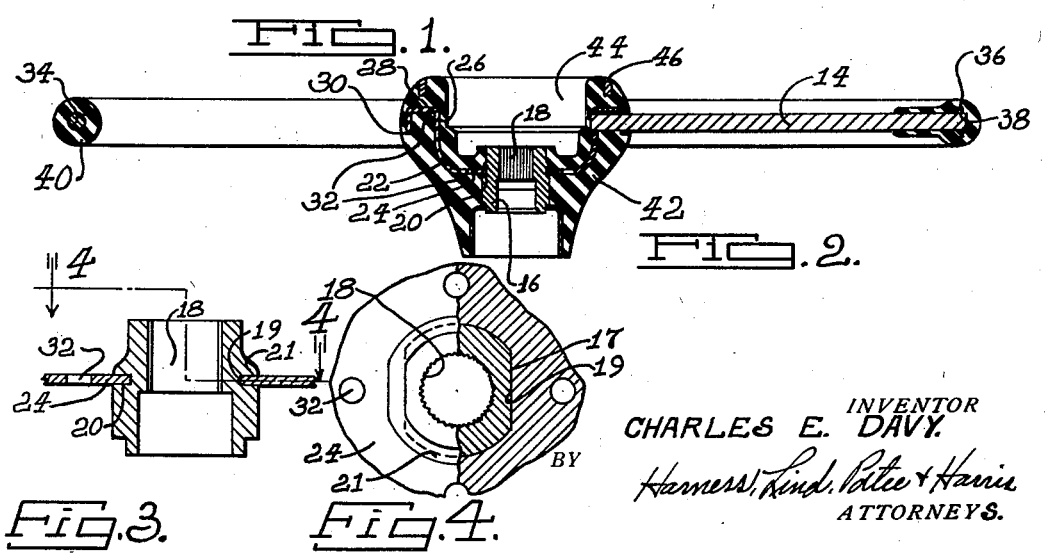
INVENTOR
CHARLES E. DAVY.
BY Harness, Lind, Pattee & Harris
ATTORNEYS.

Patented Apr. 1, 1941

2,236,674

UNITED STATES PATENT OFFICE 2,236,674

STEERING WHEEL HUB

Charles E. Davy, Detroit, Mich., assignor to Chrysler Corporation, Highland Park, Mich., a corporation of Delaware Application October 18, 1937, Serial No. 169,536

1 Claim. (Cl. 74—552)

This invention relates to a hub and more particularly to a hub for use with steering wheels for automobiles.

An object of the invention is to provide a hub having radially spaced metallic walls for receiving the inner ends of spokes connecting the hub with the rim portion of the steering wheel.

Another object of the invention is to provide integrally connected radially spaced walls which are preferably stamped from a metallic member and secured to a sleeve portion with moulded material enclosing the walls and sleeve.

Other objects and advantages of the invention will be more fully understood from the following description taken in connection with the accompanying drawing, in which:

Fig. 1 is a plan view of a steering wheel showing an adaptation of the invention.

Fig. 2 is a sectional view taken on line 2—2 of Fig. 1.

Fig. 3 is an enlarged fragmentary sectional view of the hub showing the method of securing the metallic cup to the sleeve.

Fig. 4 is a view taken on line 4—4 of Fig. 3 showing a portion in elevation and another portion in section.

Referring to the drawing, the steering wheel comprises a hub 10, annular rim 12, and radially extending spokes 14. The hub 10 comprises a sleeve 16 having a portion of its inner periphery knurled as at 18 to be received on a shaft, not shown, to prevent relative rotation between the sleeve and the shaft. The outer periphery of the hub 16 is provided with a shoulder 20. A metallic cup member 22 has an apertured bottom portion 24, an axially extending body portion 26, a radially extending flange portion 28 and an axially extending flange 30 radially spaced from the body portion 26 and coaxial therewith. The flange portion 28 and bottom portion 24 may be provided with openings 32. The cup 22 fits over the outer periphery of the sleeve 16 and rests on the shoulder 20. These parts are then secured together preferably by hydrogen welding.

The upper annular portion of the sleeve 16 above the shoulder 20 has flat portions 17 formed in its periphery and the inner periphery of the opening in the bottom portion 24 of the cup 22 is provided with correspondingly flat portions 19. The remainder of the periphery of the opening in the bottom portion 24 and the portion above the shoulder 20 may be annular. When the cup 22 is assembled on the shaft as shown, a portion of the periphery of the portion above the shoulder 20, including the flat portions, is forced downwardly on the upper surface of cup 22 forming an upper shoulder 21 above the bottom portion 24. The parts are then integrally united by welding.

The radially extending spokes 14 are shown as straight annular rods each of which extends through annular aligned openings in the flange 30 and body portion 26. The spokes at their inner ends are secured in the radially spaced walls preferably by brazing or welded.

The rim 12 is formed from an annular metallic ring 34 having flattened portions as indicated at 36. The flattened portions are provided with openings 38 to receive the outer ends of the spokes 14 in which the latter are brazed or welded. A moulded material 40 such as hard rubber is formed around the ring 34 and the outer ends of the spokes 14. A moulded material 42 is formed around the outer periphery of the hub 16 with the cup 22 embedded therein. The upper surface of the sleeve 16 is uncovered and an axially extending bore 44 is formed to receive a securing mechanism for securing the hub to a shaft. An annular reinforcing ring 46 is moulded in the upper surface of the hub to reinforce the latter.

By the arrangement of the double wall structure for receiving the inner ends of the spokes the latter have been more securely received in the hub and inasmuch as the most of the strain in a steering wheel is at right angles to the axis of the spokes, both circumferentially and axially of the steering wheel, the spokes are retained firmly at their ends to prevent twisting in the moulded material.

Various changes including the size, shape and arrangement of parts may be made without departing from the spirit of my invention and it is not my intention to limit its scope other than by the terms of the appended claim.

I claim:

A steering wheel comprising a hub having a metallic sleeve, the outer periphery of which at its opposite ends is provided with flat portions forming oppositely disposed shoulders, oppositely directed cup members having their bottom walls seated on said shoulders, the metal of the outer peripheral portion being forced over said cup shaped members, moulded material around said cup members, and the outer periphery of said sleeve, and a metallic ring spaced from the upper edge of one of said cup members moulded in said moulded material.

CHARLES E. DAVY.